US008820042B1

(12) United States Patent
Timson

(10) Patent No.: US 8,820,042 B1
(45) Date of Patent: Sep. 2, 2014

(54) LANDSCAPE RAKE

(71) Applicant: Trust Visions, LLC, Broomfield, CO (US)

(72) Inventor: Todd Timson, Broomfield, CO (US)

( * ) Notice: Subject to any disclaimer, the term of this patent is extended or adjusted under 35 U.S.C. 154(b) by 0 days.

(21) Appl. No.: 13/906,433

(22) Filed: May 31, 2013

(51) Int. Cl.
*A01D 7/00* (2006.01)
*A01D 7/08* (2006.01)

(52) U.S. Cl.
USPC ............... 56/400.17; 56/400.04; 56/400.16

(58) Field of Classification Search
USPC .............. 56/400.01, 400.16, 400.17, 400.19, 56/400.21
See application file for complete search history.

(56) References Cited

U.S. PATENT DOCUMENTS

| 885,309 | A | * | 4/1908 | Adams | 56/400.19 |
| 892,532 | A | * | 7/1908 | Long | 56/400.11 |
| 1,372,558 | A | * | 3/1921 | Saxl | 56/400.11 |
| 2,014,123 | A | * | 9/1935 | Bailie | 56/400.11 |
| 3,108,426 | A | * | 10/1963 | Rugg | 56/400.01 |
| 3,979,890 | A | * | 9/1976 | Schenk | 56/328.1 |
| 7,587,780 | B2 | * | 9/2009 | Pfister | 15/105 |

* cited by examiner

*Primary Examiner* — Alicia Torres
(74) *Attorney, Agent, or Firm* — Emery L. Tracy

(57) ABSTRACT

A landscape rake for raking a landscape environment in both a forward and backward motion to move debris is provided. The landscape rake comprises a rake head having a top surface, a bottom surface, a first end, and a second end. A rake handle is releasably secured to the top surface of the rake head approximately equidistant between the first end and the second end. At least one track is formed in the bottom surface of the rake head. At least one tine system is receivable within the at least one track with a plurality of tines secured to the at least one tine system. A securing mechanism releasably secures the at least one tine system within the at least one track wherein the landscape rake allows raking of a landscape environment in both a forward and backward motion.

16 Claims, 3 Drawing Sheets

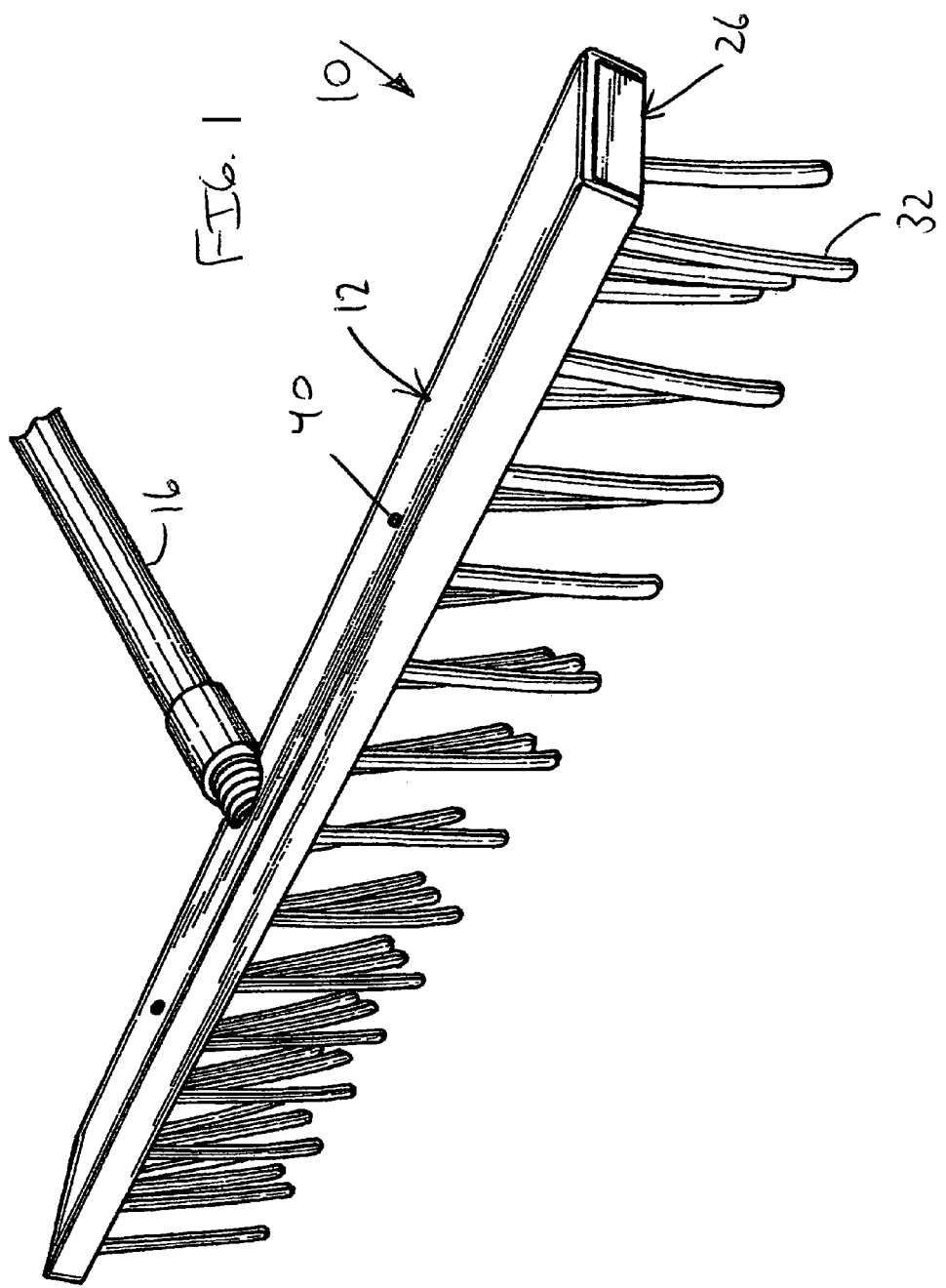

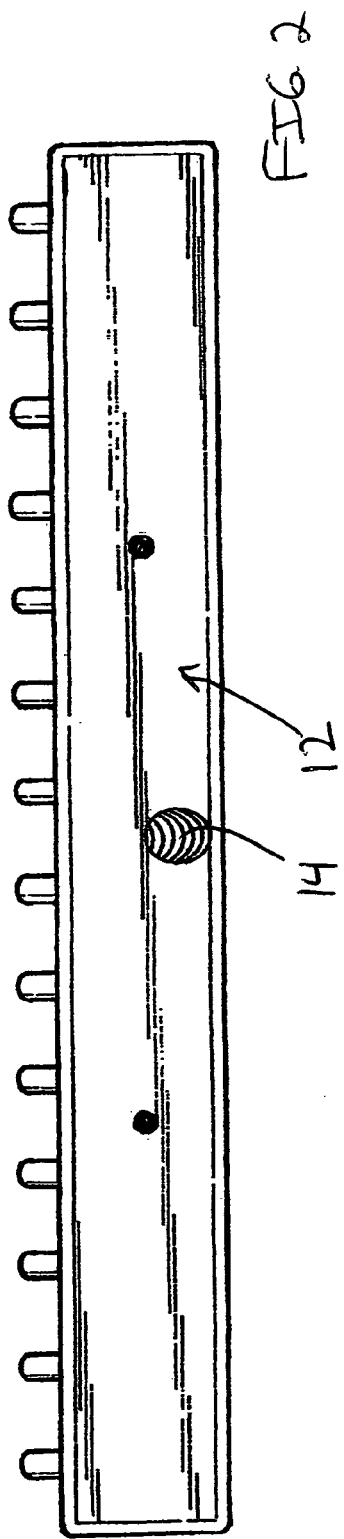
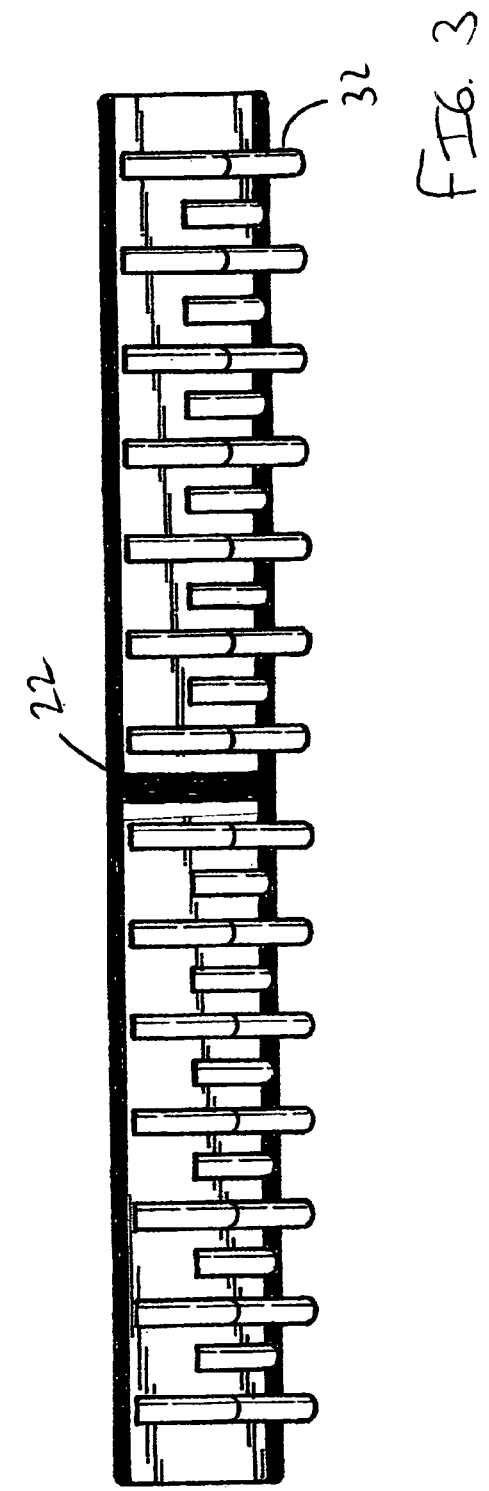

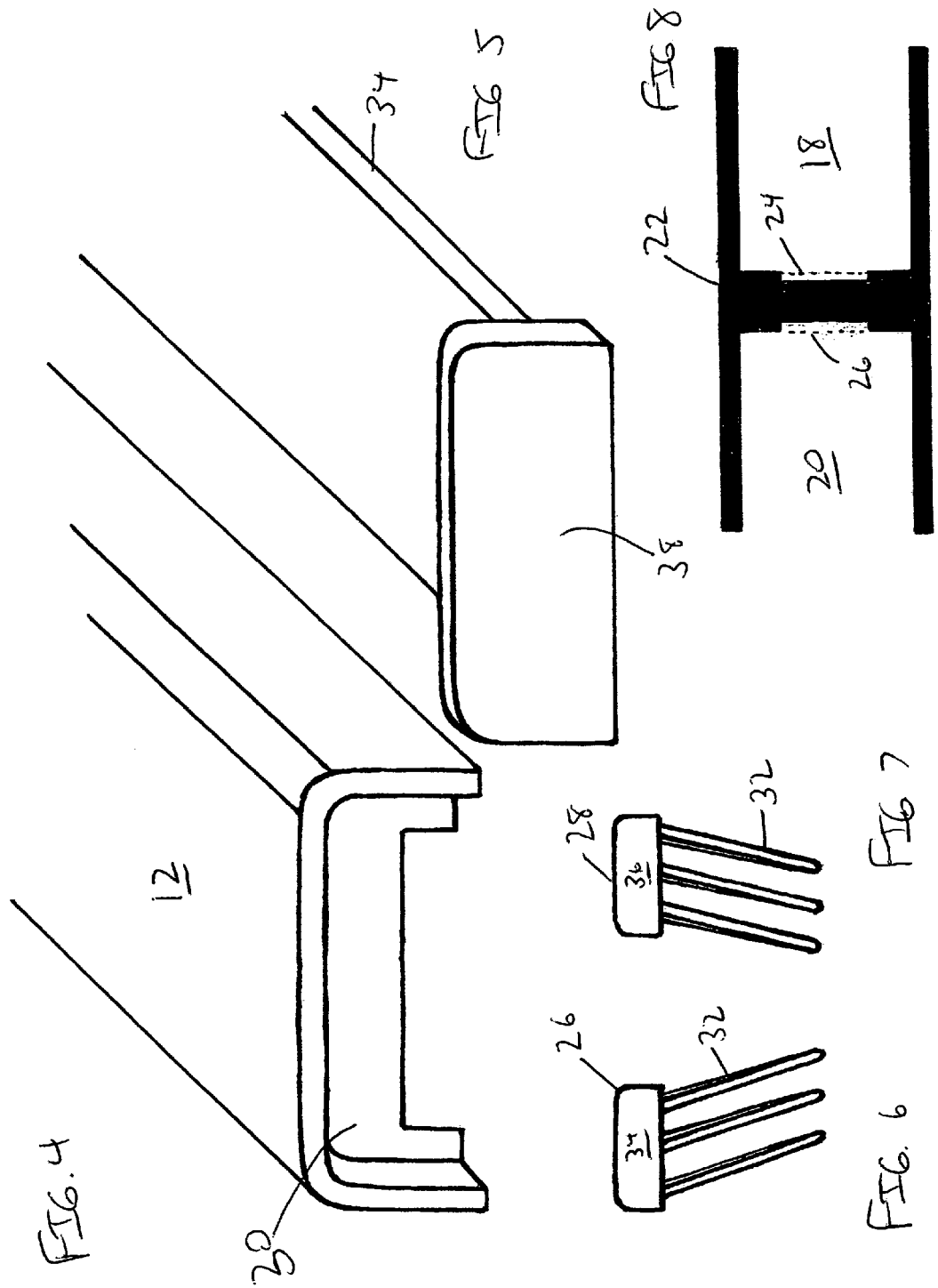

LANDSCAPE RAKE

The present application claims the benefit of priority of pending provisional patent application Ser. No. 61/638,543, filed on Apr. 26, 2012, entitled "Landscape Rake".

BACKGROUND OF THE INVENTION

1. Field of the Invention

This invention relates generally to a landscape rake and, more particularly, the invention relates to a landscape rake for raking a landscape environment in both a forward and backward motion to clean any type of debris.

2. Description of the Prior Art

A rake is a tined implement which is used for drawing together loose grass clippings or leaves and for making a surface loose or smooth. The hand held rake is an ancient farming and gardening invention which has been used for many centuries.

In general, lawn and yard rakes are standard hand tools used for gathering grass, leaves, and other light yard debris. Standard yard rakes have an elongated, straight and rigid handle attached to a rake head. The handle is typically made of strong but lightweight materials such as wood, aluminum, light gauge steel, and hard plastic. The rake head is typically made of lightweight and resilient material such as bamboo, plastic, or thin metal strips. Yard rakes are used sporadically, with most use coming during the spring and fall seasons for obvious reasons. Often, persons not accustomed to doing manual labor use yard rakes. Standard yard rakes with straight handles and semi-resilient rake heads require a great deal of upper body strength to use. Over the years attempts have been made to improve upon the standard rake design having a straight handle and semi-resilient rake head.

SUMMARY

The present invention is a landscape rake for raking a landscape environment in both a forward and backward motion to move debris. The landscape rake comprises a rake head having a top surface, a bottom surface, a first end, and a second end. A rake handle is releasably secured to the top surface of the rake head approximately equidistant between the first end and the second end. At least one track is formed in the bottom surface of the rake head. At least one tine system is receivable within the at least one track with a plurality of tines secured to the at least one tine system. A securing mechanism releasably secures the at least one tine system within the at least one track wherein the landscape rake allows raking of a landscape environment in both a forward and backward motion.

In addition, the present invention includes a landscape rake for raking a landscape environment in both a forward and backward motion to move debris. The landscape rake comprises a rake head having a top surface, a bottom surface, a first end, and a second end. A rake handle is releasably secured to the top surface of the rake head approximately equidistant between the first end and the second end. A first track is formed in the first end of the rake head. A second track is formed in the second end of the rake head. A first tine system is receivable within the first track and a second tine system is receivable within the second track. A plurality of tines is secured to the first tine system and the second tine system. At least one first set screw is secured through the rake head into the first tine system and at least one second set screw secured through the rake head into the second tine system wherein the landscape rake allows raking of a landscape environment in both a forward and backward motion.

BRIEF DESCRIPTION OF THE DRAWINGS

FIG. 1 is a perspective view illustrating a landscape rake, constructed in accordance with the present invention, with a replaceable tine system releasably secured within a rake head;

FIG. 2 is a top plan view illustrating the landscape rake, constructed in accordance with the present invention, with the replaceable tine system releasably secured within the rake head;

FIG. 3 is a bottom plan view illustrating the landscape rake, constructed in accordance with the present invention, with the replaceable tine system releasably secured within the rake head;

FIG. 4 is a side perspective view illustrating the rake head of the landscape rake, constructed in accordance with the present invention, with the replaceable tine system removed from the rake head;

FIG. 5 is a perspective view illustrating the replaceable tine system of the landscape rake, constructed in accordance with the present invention;

FIG. 6 is an elevational right side view illustrating a first replaceable tine system of the landscape rake, constructed in accordance with the present invention;

FIG. 7 is an elevational left side view illustrating a second replaceable tine system of the landscape rake, constructed in accordance with the present invention; and FIG. 8 is a bottom plan view illustrating the rake head of the landscape rake, constructed in accordance with the present invention, with the replaceable tine system removed from the rake head.

DETAILED DESCRIPTION OF THE PREFERRED EMBODIMENTS

As illustrated in FIGS. 1-8, the present invention is a landscape rake, indicated generally at 10, for raking a landscape environment in both a forward and backward motion to clean any type of debris. The landscape rake 10 of the present invention is suitable for raking all types of debris including, but not limited to, leaves, mulch, loose sticks, small rocks, dirt, etc.

The landscape rake 10 of the present invention includes a rake head 12 having a first end and a second end. In an approximate center of the rake head 12 between the first end and the second end, the rake head 12 preferably has a threaded aperture 14 for receiving a rake handle 16. Although the rake head 12 has been described and illustrated as threadably receiving a rake handle 16, other mechanisms for securing the rake handle 16 to the rake head 12 is within the scope of the present invention.

The rake head 12 of the landscape rake 10 of the present invention further includes a first track 18 formed in the first end of the rake head 12 and a second track 20 formed in the second end of the rake head 12. Preferably, the first track 18 extends from the first end of the rake head 12 to a first point nearingly adjacent the center point of the rake head 12 and the second track 20 extends from the second end of the rake head 12 to a second point nearingly adjacent the center point of the rake head 12. Preferably, the first point is spaced from the second point by a block 22 of material formed from the rake head 12. A first undercut 24 or slot can be formed in the block 22 at the end of the first track 18 and a second undercut 26 or slot can be formed in the block 22 at the end of the second track 20 for holding a first replaceable tine system 26 and a second replaceable tine system 28, respectively, in place, as will be described in further detail below.

In addition, the rake head of the landscape rake 10 of the present invention has a first recessed portion 30 formed at the first end of the rake head 12 and a second recessed portion (not shown) formed at the second end of the rake head 12. The first recessed portion 30 and the second recessed portion further assist in releasably securing the first replaceable tine system 26 and the second replaceable tine system 28, respectively, to the rake head 12, as will be described in further detail below.

As previously mentioned, the landscape rake 10 of the present invention has a first replaceable tine system 26 and a second replaceable tine system 28. Both the first replaceable tine system 26 and the second replaceable tine system 28 have a plurality of angled tines 32 mounted in a rectangular first tine block 34 and a rectangular second tine block 36, respectively, for raking the debris. With angled tines 32, the user can push debris forward with the tines 32 springing and backward holding the debris without grabbing or sticking to the ground. The tines 32 within the first replaceable tine system 26 and the second replaceable tine system 28 can be replaced with additional tines 32, such as metal spring, plastic, grade, thatch, or garden rake tines, as needed.

In a preferred embodiment of the landscape rake 10 of the present invention, each replaceable tine system 26, 28 has three layers of tines 32. The three layers of tines 32 inhibit material from sliding through the tines 32 as the material is being raked. The three layers of tines 32 also promote fester debris movement as compared to a one tine or single tine system. Furthermore, it is preferable that the tines 32 are staggered with each of the replaceable tine systems 26, 28. Once again, the staggered tines 32 will inhibit material being lost through the tines 32 as the landscape is being raked with the landscape rake 10 and the tines 31 are easier to clean.

With the landscape rake 10 of the present invention, it is desirable to have shorter lines 32 as compared to longer tines 32. Shorter tines 32 make the landscape rake 10 more useful when moving or cleaning large amounts of debris. The shorter tines 32 also make the landscape rake 10 more balanced and stable to the ground when using the landscape rake 10 either the forward or backward motion.

In preferred embodiment, the lines 32 of the landscape rake 10 of the present invention are tapered, i.e., thicker at top than at bottom. Once again, this tine design creates a more balanced and stable landscape rake 10 when using the landscape rake 10 in either the forward or backward motion.

Both the first tine block 34 and the second tine block 36 of the first replaceable tine system 26 and the second replaceable tine system 28 of the landscape rake 10 of the present invention have an end cap 38 formed thereon. As the first replaceable tine system 26 and the second replaceable tine system 28 are inserted into the first guide 18 and the second guide 20, respectively, of the rake head 12, an extension portion on an end of the first tine block 34 and the second tine block 36 is receivable within the first undercut 24 and the second undercut 36, respectively, and the end caps 38 on the other end of the first tine block 34 and the second tine block 36 are received within the first recessed portion 30 and the second recessed portion, respectively. At least one set screw 40 is then secured through the rake head 12 into the first tine block 34 and the second tine block 36 for releasably securing the first replaceable tine system 26 and the second replaceable tine system 28 to the rake head 12.

It should be noted that while the landscape rake 10 of the present invention has been described an illustrated as having a first replaceable tine system 26 and the second replaceable tine system 28 releasably secured within the rake head 1, it is within the scope of the present invention to have only on replaceable tine system releasably secured within the rake head 12. In this embodiment, the single replaceable tine system will extend substantially from the first end of the rake head 12 to the second end of the rake head 12.

The foregoing exemplary descriptions and the illustrative preferred embodiments of the present invention have been explained in the drawings and described in detail, with varying modifications and alternative embodiments being taught. While the invention has been so shown, described and illustrated, it should be understood by those skilled in the art that equivalent changes in form and detail may be made therein without departing from the true spirit and scope of the invention, and that the scope of the present invention is to be limited only to the claims except as precluded by the prior art. Moreover, the invention as disclosed herein, may be suitably practiced in the absence of the specific elements which are disclosed herein.

What is claimed is:

1. A landscape rake for raking a landscape environment in both a forward and backward motion to move debris, the landscape rake comprising:
   a rake head having a top surface, a bottom surface, a first end, and a second end;
   a rake handle releasably secured to the top surface of the rake head approximately equidistant between the first end and the second end;
   a first track formed in the first end of the rake head;
   a second track formed in the second end of the rake head;
   a first tine system receivable within the first track;
   a second tine system receivable within the second track;
   a plurality of tines secured to the first tine system and the second tine system; and
   securing means for releasably securing the first tine system within the first track and securing the second tine system within the second track;
   wherein the first track extends from the first end of the rake head to a first point nearingly adjacent a center point of the rake head;
   wherein the second track extends from the second end of the rake head to a second point nearingly adjacent the center point of the rake head;
   wherein the first point is spaced from the second point by a block of material formed from the rake head; and
   wherein the landscape rake allows raking of a landscape environment in both a forward and backward motion.

2. The landscape rake of claim 1 wherein the rake handle has a plurality of threads and the top surface of the rake head has a threaded aperture, the threads of the rake handle threadably receivable within the threaded aperture of the rake head.

3. The landscape rake of claim 1 and further comprising:
   a first undercut formed in the block within the first track; and
   a second undercut formed in the block within the second track;
   wherein the first undercut and the second undercut receives a portion of the first tine system and the second tine system, respectively, for releasably holding the first tine system and the second tine system.

4. The landscape rake of claim 1 and further comprising:
   a first recessed portion formed at the first end of the rake head;
   a second recessed portion formed at the second end of the rake head;
   a first end cap formed on the first tine system; and
   a second end cap formed on the second tine system;

wherein the first end cap is receivable within the first recessed portion; and wherein the second end cap is receivable within the second recessed portion.

5. The landscape rake of claim 1 and further comprising:
at least one first set screw secured through the rake head into the first tine system; and
at least one second set screw secured through the rake head into the second tine system.

6. The landscape rake of claim 1 wherein the tines are angled relative to the at least one tine system.

7. The landscape rake of claim 1 and further comprising:
three layers of angled tines.

8. The landscape rake of claim 1 wherein the tines are staggered.

9. The landscape rake of claim 1 wherein the tines are tapered.

10. The landscape rake of claim 1 and further comprising:
three layers of tapered, staggered, angled tines.

11. A landscape rake for raking a landscape environment in both a forward and backward motion to move debris, the landscape rake comprising:
a rake head having a top surface, a bottom surface, a first end, and a second end;
a rake handle releasably secured to the top surface of the rake head approximately equidistant between the first end and the second end;
a first track formed in the first end of the rake head;
a second track formed in the second end of the rake head;
a first tine system receivable within the first track;
a second tine system receivable within the second track;
at least one first set screw secured through the rake head into the first tine system;
at least one second set screw secured through the rake head into the second tine system;
a plurality of tines secured to the first tine system and the second tine system; and
securing means for releasably securing the first tine system within the first track and the second tine system within the second track;
wherein the first track extends from the first end of the rake head to a first point nearingly adjacent a center point of the rake head;
wherein the second track extends from the second end of the rake head to a second point nearingly adjacent the center point of the rake head; and
wherein the landscape rake allows raking of a landscape environment in both a forward and backward motion.

12. The landscape rake of claim 11 wherein the first point is spaced from the second point by a block of material formed from the rake head.

13. The landscape rake of claim 11 and further comprising:
a first recessed portion formed at the first end of the rake head;
a second recessed portion formed at the second end of the rake head
a first end cap formed on the first tine system; and
a second end cap formed on the second tine system;
wherein the first end cap is receivable within the first recessed portion; and
wherein the second end cap is receivable within the second recessed portion.

14. A landscape rake for raking a landscape environment in both a forward and backward motion to move debris, the landscape rake comprising:
a rake head having a top surface, a bottom surface, a first end, and a second end;
a rake handle releasably secured to the top surface of the rake head approximately equidistant between the first end and the second end;
a first track formed in the first end of the rake head;
a second track formed in the second end of the rake head;
a first tine system receivable within the first track;
a second tine system receivable within the second track;
a plurality of tines secured to the first tine system and the second tine system;
securing means for releasably securing the first tine system in the first track and the second tine system in the second track;
a first recessed portion formed at the first end of the rake head;
a second recessed portion formed at the second end of the rake head;
a first end cap formed on the first tine system; and
a second end cap formed on the second tine system;
wherein the first track extends from the first end of the rake head to a first point nearingly adjacent a center point of the rake head;
wherein the second track extends from the second end of the rake head to a second point nearingly adjacent the center point of the rake head;
wherein the first end cap is receivable within the first recessed portion;
wherein the second end cap is receivable within the second recessed portion; and
wherein the landscape rake allows raking of a landscape environment in both a forward and backward motion.

15. The landscape rake of claim 14 wherein the first point is spaced from the second point by a block of material formed from the rake head.

16. The landscape rake of claim 14 and further comprising:
at least one first set screw secured through the rake head into the first tine system; and
at least one second set screw secured through the rake head into the second tine system.

* * * * *